United States Patent
Thekale et al.

(10) Patent No.: US 11,053,596 B2
(45) Date of Patent: Jul. 6, 2021

(54) OPTIMIZATION OF A SEQUENCE OF STRIPS TO BE PICKLED, ON THE BASIS OF MODELLING OF A PICKLING LINE

(71) Applicant: Primetals Technologies Germany GmbH, Erlangen (DE)

(72) Inventors: Alexander Thekale, Erlangen (DE); Samuel Walter, Erlangen (DE)

(73) Assignee: PRIMETALS TECHNOLOGIES GERMANY GMBH

( * ) Notice: Subject to any disclaimer, the term of this patent is extended or adjusted under 35 U.S.C. 154(b) by 0 days.

(21) Appl. No.: 15/305,970

(22) PCT Filed: Mar. 25, 2015

(86) PCT No.: PCT/EP2015/056344
§ 371 (c)(1),
(2) Date: Oct. 21, 2016

(87) PCT Pub. No.: WO2015/161975
PCT Pub. Date: Oct. 29, 2015

(65) Prior Publication Data
US 2017/0044676 A1    Feb. 16, 2017

(30) Foreign Application Priority Data

Apr. 24, 2014   (EP) .................................... 14165815

(51) Int. Cl.
*C23G 3/02*       (2006.01)
*G05B 13/04*      (2006.01)
*G05B 17/02*      (2006.01)

(52) U.S. Cl.
CPC .............. *C23G 3/02* (2013.01); *G05B 13/041* (2013.01); *G05B 17/02* (2013.01)

(58) Field of Classification Search
CPC ........ C23G 3/02; G05B 13/041; G05B 17/02; G05B 13/04
See application file for complete search history.

(56) References Cited

U.S. PATENT DOCUMENTS 6,410,351 B1   6/2002  Bode et al.
7,720,653 B2   5/2010  Metzger et al.
(Continued)

FOREIGN PATENT DOCUMENTS

CN   1751277 A    3/2006
RU   2 310 599   11/2007

OTHER PUBLICATIONS

International Search Report dated Feb. 1, 2016 issued in corresponding International patent application No. PCT/EP2015/056344.
(Continued)

*Primary Examiner* — Alexander Markoff
(74) *Attorney, Agent, or Firm* — Ostrolenk Faber LLP

(57) ABSTRACT

Pickling a plurality of steel strips (2) having initial material properties (ME) on a pickling line: A computer (5) defines a number of sequences (Gi), which each contain the number of strips (2) to be pickled. For each of the defined sequences (Gi), the computer (5) determines an optimized mode of operation of the pickling line and, on the basis of the mode of operation, at least one measure (M), by means of a model (9) of the pickling line based on mathematical physical equations and by using the initial material properties (ME) of the strips. As long as a termination criterion (K) is not met, the computer (5) varies the defined sequences (Gi) and determines respective optimized modes of operation of the pickling line and associated measures (M) anew. As soon as the termination criterion (K) is met, the computer (5) either selects one of the last defined sequences (Gi) and initiates the control of the pickling line in accordance with the selected sequence (Gi) or offers to an operator (13) a
(Continued)

plurality of the last defined sequences (Gi) together with the respective measures (M) thereof, receives a selection command (SEL) for selecting one of the offered sequences (Gi) from the operator (13), and initiates the control of the pickling line in accordance with the sequence (Gi) selected from the operator (13).

11 Claims, 5 Drawing Sheets

(56) References Cited

U.S. PATENT DOCUMENTS

| | | | |
|---|---|---|---|
| 8,834,636 B2* | 9/2014 | Barbieri | C23G 3/02 134/122 R |
| 2003/0155040 A1* | 8/2003 | Schoen | C21D 8/1211 148/111 |
| 2005/0173373 A1 | 8/2005 | Olafsson | 216/37 |
| 2005/0222781 A1 | 10/2005 | Yue et al. | |
| 2005/0267612 A1 | 12/2005 | Metzger | |
| 2006/0037868 A1* | 2/2006 | Dulcetti | C25F 1/06 205/674 |
| 2006/0200265 A1 | 9/2006 | Hsu et al. | |
| 2007/0122920 A1 | 5/2007 | Bornstein | |
| 2008/0185103 A1 | 8/2008 | Bornstein et al. | 156/345.24 |
| 2010/0036514 A1 | 2/2010 | Funk et al. | |
| 2010/0269854 A1* | 10/2010 | Barbieri | C23G 1/02 134/3 |
| 2013/0029054 A1* | 1/2013 | Malloy | C23G 3/023 427/444 |
| 2015/0316938 A1* | 11/2015 | Tang | G06F 17/16 700/266 |
| 2016/0045841 A1* | 2/2016 | Kaplan | B01J 19/0093 429/49 |
| 2017/0044676 A1* | 2/2017 | Thekale | G05B 13/041 |
| 2017/0316131 A1* | 11/2017 | Tang | G06F 17/5009 |

OTHER PUBLICATIONS

Written Opinion dated Feb. 1, 2016 issued in corresponding International patent application No. PCT/EP2015/056344.
International Preliminary Report on Patentability dated Jul. 4, 2016 issued in corresponding International patent application No. PCT/EP2015/056344.
European Search Report dated Oct. 6, 2014 issued in corresponding European patent application No. 14 16 5815.
Dr. Rafael Rituper, *Beizen von Metallen*, Eugen G. Leuze Verlag, pp. 182-187 (1993).
English language translation of Dr. Rafael Rituper et al., "Beizen von Metallen," pp. 182-187 (1993).
Dr. Rupert Puntigam, "Die Zunderausbildung auf Warmband in der Breitbandstraße," Technical University of Vienna, pp. 1, 2, 39-43, 118-120 and 173-178 (2002) and English language translation.
C. Aurora, et al. "Pickling Line Modelling for Advanced Process Monitoring and Automation" (Nov. 2006) Danieli Automation SpA, Flat Products Department, via B. Stringher 4, 33042 Buttrio (UD), Italy.

* cited by examiner

OPTIMIZATION OF A SEQUENCE OF STRIPS TO BE PICKLED, ON THE BASIS OF MODELLING OF A PICKLING LINE

CROSS-REFERENCE TO RELATED APPLICATIONS

The present application is a 35 U.S.C. §§ 371 national phase conversion of PCT/EP2015/056344, filed Mar. 25, 2015, which claims priority of European Patent Application No. 14165815.3, filed Apr. 24, 2014, the contents of which are incorporated by reference herein. The PCT International Application was published in the German language.

TECHNICAL FIELD

The present invention relates to an operating method for a pickling line in which a plurality of strips, particularly steel strips, to be pickled respectively have initial material properties.

The present invention also relates to machine-readable program code for a computer, the program code having control commands which when implemented have the effect that the computer performs such an operating method.

The present invention also relates to a computer programmed with such program code.

TECHNICAL BACKGROUND

The purpose of a pickling line is to free the strips to be pickled of scale. The layer thickness of the scale and its composition (phases: magnetite=$Fe_3O_4$, hematite=$Fe_2O_3$, wustite=FeO) depend on the chemical composition and pre-history of the strips.

In order to maximize the throughput of the pickling line, and thereby minimize the overall time for the process and/or for example minimize an energy consumption of the pickling line, the aim is to keep the time that strips to be pickled stay in the pickle and any changeover times between two strips to be pickled as small as possible. The optimum time that a strip stays in a pickling line is influenced by the layer of scale on the surface of the respective strip, the nature of the pickling line, the pickling medium (in particular the acid concentration) and other operating parameters of the pickling line (for example the temperature of the pickling medium).

The optimum staying time and the associated optimum settings of the pickling line are generally either taken from tables or determined with the aid of a model of the pickling line. The model of the pickling line may be based on mathematical-physical equations. The model of the pickling line may in turn consist of a number of submodels.

If strips that have differing material properties are to be pickled one after the other, generally the operating parameters of the pickling line must in each case be adapted. These operating parameters are determined by means of the model of the pickling line in such a way that the throughput is maximized and the overall time for the process is minimized.

The model of the pickling line makes allowance in the determination of the operating parameters of the pickling line for example for the material properties of the strips, production specifications and the state of the pickling line. The model of the pickling line often also determines the energy consumption. In particular during transitional times, however, the pickling result, with respect to the overall time for the process and/or the energy consumption, is often not optimal. With a given production plan, i.e. a given sequence in which the strips are to be pickled, the transitional times may represent a significant proportion of the overall time for the process. Two different possible production plans, that is, two sequences of strips that are different from one another, which contain the same strips in different sequences, can therefore have overall times for the process that are different from one another and/or overall energy consumptions that are different from one another.

The prior art discloses a given production plan, i.e. with a given sequence of strips, to determine a respective optimized operating mode of the pickling line by means of a model of the pickling line based on mathematical-physical equations and to operate the pickling line so as to correspond to the optimized operating mode determined.

It is also known in the prior art to optimize the production plan, that is the sequence as such. In the course of this optimization, production plans are generated manually or with the aid of mathematical methods. In the course of these generation processes, including their assessment, models that describe the pickling process are not used. The energy consumption results from the production plan and is not optimized. To create a "good" production plan, i.e. a production plan with a low overall time for the process and low overall energy requirement, the producer of the production plan often requires considerable operator know-how.

U.S. Pat. No. 6,410,351 B1 discloses an operating method for etching a process layer on a wafer, a given etching sequence being carried out with the aid of models.

SUMMARY OF THE INVENTION

The object of the present invention is to provide possibilities by means of which an optimized production plan can be determined in an easy and reliable way.

According to the invention, an operating method for a pickling line in which a number of strips to be pickled are to be pickled has the following steps:
a) a computer sets a number of sequences, which respectively contain the number of strips to be pickled and their initial material properties,
b) the computer determines for the set sequences a respective optimized operating mode of the pickling line by means of a model of the pickling line based on mathematical-physical equations and by using their initial material properties and determines at least one respective measure on the basis of the operating mode,
c) as long as a termination criterion is not satisfied, the computer varies the set sequences according to an amendment specification and returns to step b),
d) as soon as the termination criterion is satisfied, the computer either selects one of the last-set sequences and initiates the control of the pickling line according to the selected sequence or offers a number of the last-set sequences together with their respective measure to an operator for selection, receives from the operator a selection command for selecting one of the sequences offered and initiates the control of the pickling line according to the sequence selected by the operator.

It is possible that in the course of step a) the computer sets only a single sequence. In this case, in the course of step c) the computer varies the set sequence. It is alternatively possible that in the course of step a) the computer sets a number of sequences. In this case, in the course of step c) the computer generally retains at least the previously best sequence for the subsequent iteration. The other sequences for the subsequent iteration may be determined according to requirements. What is decisive is that the number of sequences and/or the sequences as such is/are different after the variation than before.

The model of the pickling line is known as such. However, in the prior art it is only used with a given sequence of strips to determine the associated optimized operating mode of the pickling line. On the other hand, in the prior art it is not used to determine the sequence of strips as such.

The termination criterion may be determined according to requirements. For example, the termination criterion may be that no improvements or only marginal improvements of the best measure have occurred during a number of successive iterations. Alternatively or in addition, the termination criterion may be that a maximum number of iterations is specified. The termination criterion may also be that a sequence of strips that is deemed to be sufficiently good is determined. Combinations of these criteria are also possible. What is decisive is that the termination criterion ensures that only a finite number of iterations are carried out.

The material properties of the strips may be determined according to requirements. Generally, the material properties of the strips comprise the chemical composition and/or geometrical parameters and/or a pre-history of the respective strip. They may comprise further parameters, such as for example temperatures and phase proportions of the material of which the strips consist.

Preferably, the computer additionally receives boundary conditions with respect to the strips and/or with respect to the pickling line and makes allowance for the boundary conditions in the course of the determination of the respective optimized operating mode of the pickling line and/or the variation of the sequences. With respect to the respective strips, the boundary conditions may for example comprise times by which at the latest the strips must have been pickled. Furthermore—possibly with respect to individual strips—the boundary conditions may comprise temperatures that a pickling bath in which the strips are pickled should have. The boundary conditions may also comprise temperature intervals.

Preferably, the computer receives an initial state of the pickling line and makes allowance for the initial state of the pickling line in the course of the determination of the respective optimized operating mode of the pickling line and/or the variation of the sequences. The initial state may for example comprise a chemical composition (under certain circumstances only the initial chemical composition) (in particular acid concentration) and/or an initial temperature of the pickling bath or possibly a number of pickling baths and/or technical possibilities of the pickling line, for example heating ramps that are technically possible as a maximum.

It is possible that the computer determines the number of sequences in step a) on the basis of a more or less random, unordered initial sequence of the strips. Preferably, however, the computer determines an initial sequence of the strips before the implementation of step a) and then determines the number of sequences in step a) on the basis of the initial sequence. As a result, in many cases sequences that tend to be already optimized can be used as a basis.

Preferably, the measures incorporate an overall time for the process and/or an overall energy requirement of the pickling line for pickling the number of strips according to the respective sequence. However, other variables are also possible, for example penalty terms for an infringement of specified boundary conditions or too great an approximation to specified limits.

It is possible that the computer varies the set sequences in step c) in a statistical or random way. Preferably, however, the computer varies the set sequences in step c) by making allowance for variables or interim results determined in the course of step b).

Preferably, the computer varies the set sequences in step c) by using methods of mathematical optimization. As a result, it is generally possible to find in a relatively easy, quick and reliable way a sequence of strips that makes an optimum or at least virtually optimum operating mode of the pickling line possible.

It is possible that steps a) to d) are implemented in advance, that is to say while there is still no strip in the pickling line or, though there is at least one strip in the pickling line, the production plan that contains this strip has already been determined and the production plan that is then determined is determined for strips that are still upstream of the pickling line. Alternatively, it is however similarly possible that steps a) to d) are implemented while at least one strip is in the pickling line, that the at least one strip in the pickling line is the first strip in the sequences set in step a) and that the at least one strip in the pickling line remains the first strip in the sequences varied in step c). In this case it is possible to respond to amendments of boundary conditions, for example while operation of the pickling line is in progress, for example to respond to the requirement that some strips are now to be pickled with priority and/or that a previously given priority is no longer applicable.

Preferably, operating data of the pickling line are recorded during the control of the pickling line according to the selected sequence and the model of the pickling line and/or the amendment specification is/are adapted on the basis of a deviation of the operating data of the pickling line from expected operating data of the pickling line. As a result, a continuously progressing adaptation of the model of the pickling line and an optimization of the amendment specification are possible.

The object is also achieved by machine-readable program code. According to the invention, the implementation of the control commands has the effect that the computer performs an operating method according to the invention. The program code may in particular be stored on a machine readable, non-volatile storage medium.

According to the invention, the computer includes the machine readable storage medium which is programmed with the program code according to the invention.

It is possible that the computer is formed as a control device for a pickling line for pickling strips. Alternatively, the computer may be connected in terms of data technology to such a control device.

The properties, features and advantages of this invention that are described above and the manner in which they are achieved become clearer and more clearly understandable in connection with the following description of the exemplary embodiments, which are described more specifically in connection with the drawings, in which:

BRIEF DESCRIPTION OF THE DRAWINGS

FIG. 1A shows a detail of FIG. 1,

DESCRIPTION OF AN EMBODIMENT

Figure 1:
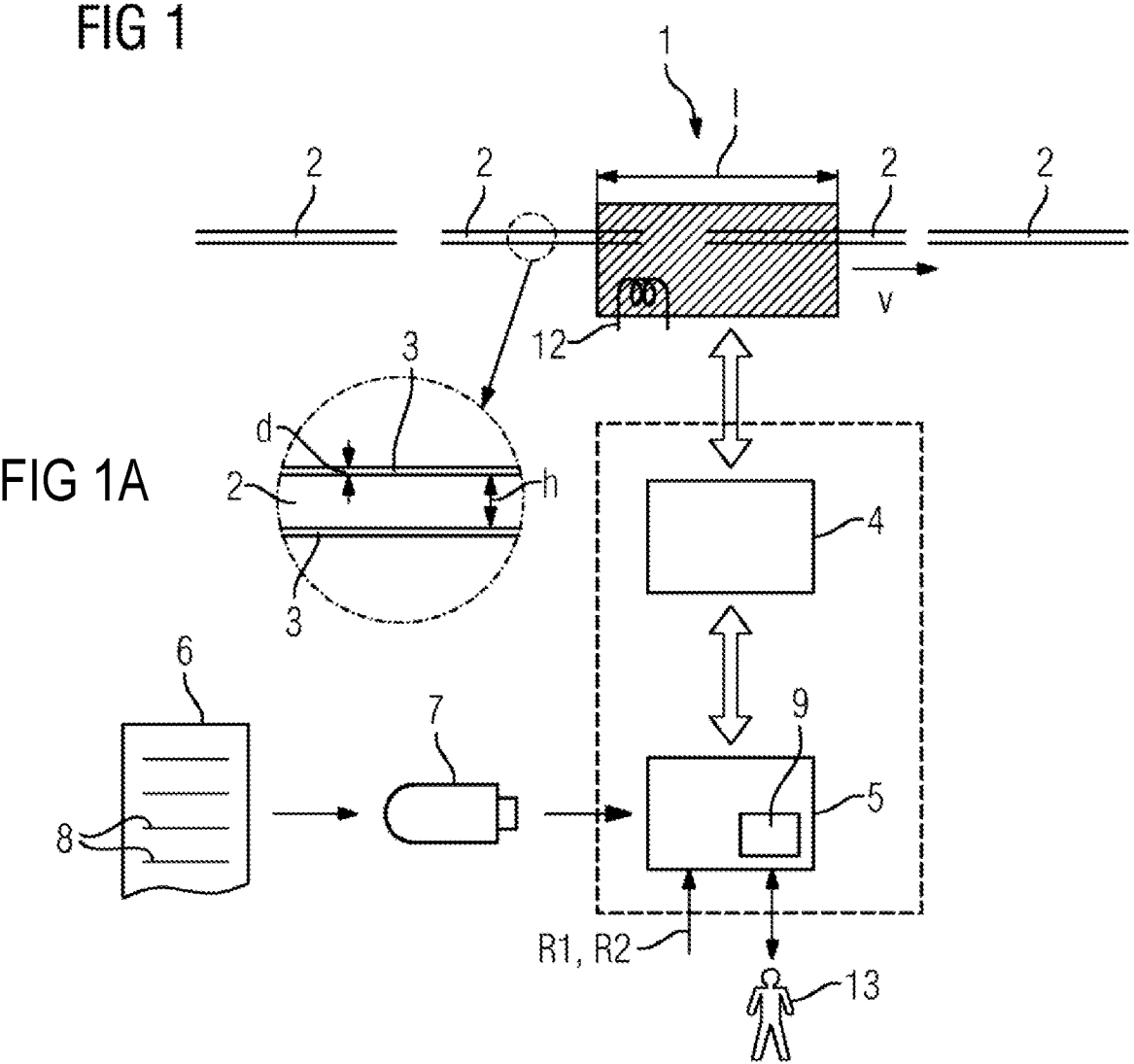
FIG. 1 shows a pickling line in a schematic representation.

According to FIG. 1, a plurality of strips 2 are to be pickled in a (at least one) pickling bath 1 of a pickling line. The strips 2 consist of metal, for example steel. The pickling is intended to remove a layer of scale 3, which has a layer thickness d. For this purpose, the strips 2 are transported one after the other through the pickling bath 1 at a speed v. The speed v may be constant over time or may vary over time. The speed v together with a length 1 of the pickling bath 1 consequently results in a respective staying time t.

The pickling line is controlled by a control device 4. The precise construction of the control device 4 and its operating principle are of secondary importance within the scope of the present invention. What is decisive is that the control device and a computer 5, the operating principle of which is explained more specifically below, are connected to one another in terms of data technology. Alternatively, the control device 4 and the computer 5 may be one and the same device. In this case, the computer 5 is at the same time formed as a control device for the pickling line. This possibility is indicated in FIG. 1 by the control device 4 and the computer 5 being surrounded by a broken line.

The computer 5 is programmed with machine-readable program code 6 on a non-volatile storage medium. The program code 6 may be fed to the computer 5 for example by way of the storage medium 7, on which the program code 6 is stored in a machine-readable form, usually in an exclusively machine-readable form, for example in an electronic form. The program code 6 comprises control commands 8. The implementation of the control commands has the effect that the computer 5 performs an operating method, such as that explained more specifically below in connection with FIG. 2.

Figure 2:
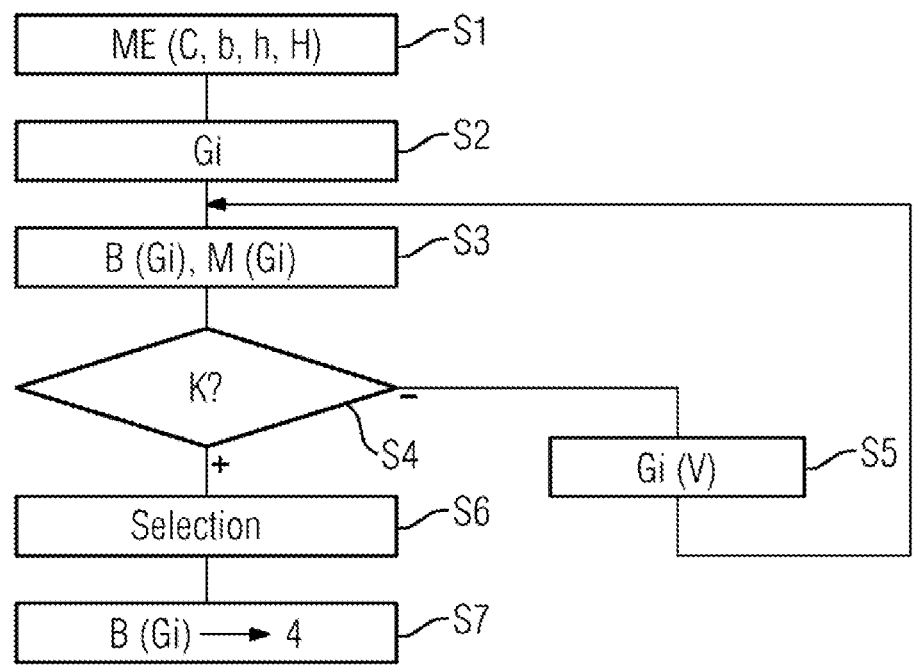
FIG. 2 shows a flow diagram in a schematic representation.

According to FIGS. 1 and 2, in a step S1, the computer 5 receives information concerning a number of strips 2 to be pickled. The strips 2 respectively have initial material properties ME. Examples of initial material properties ME are the chemical composition C of the respective strip 2, its geometrical parameters, in particular its width b and its thickness h, and/or a pre-history H of the respective strip 2. The pre-history H may in particular give information about a temperature of the strip 2 and the layer thickness d. In the course of step S1, the computer 5 also receives the material properties ME.

In a step S2 in FIG. 2, the computer 5 sets a number of sequences Gi (i=1, 2, 3, . . . ). The set sequences Gi respectively contain the number of strips 2 to be pickled. The sequences Gi thus represent permutations of the number of strips 2.

Figure 3:
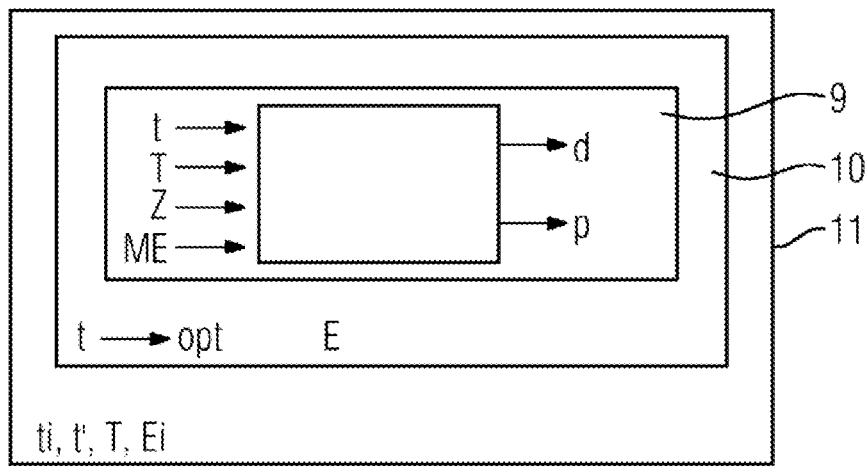
FIG. 3 shows a model of the pickling line in a schematic representation.

In a step S3 in FIG. 3, the computer 5 determines for the set sequences Gi a respective optimized operating mode B of the pickling line by means of a model 9 of the pickling line. See FIGS. 1 and 3. Furthermore, in step S3 the computer 5 determines at least one respective measure M for the respective set sequence Gi by means of the model 9. Step S3 is explained more specifically below in connection with FIG. 3.

According to FIG. 3, for a certain strip 2 the corresponding staying time t of the strip 2 in the pickling bath 1, a temperature T of the pickling bath 1, a composition Z of the pickling bath 1 (for example an acid concentration) and the material properties ME of the strip 2 under consideration are specified to the model 9. In the case of a number of pickling baths 1, the respective variables are specified individually for the respective pickling bath 1. According to FIG. 3, the model 9 is based on mathematical-physical equations. The equations may in particular be algebraic equations and/or differential equations. The model 9 determines on the basis of the variables t, T, Z, ME specified to the model 9, that is, including use of the material properties ME of the strip 2 under consideration, and by applying the equations of the model 9, the resultant layer thickness d of the layer of scale 2. The associated phase proportions p of the layer of scale 3 may possibly also be additionally determined.

In a lower-level layer of optimization 10, the staying time t is then optimized for the respective strip 2, so that the resultant layer thickness d of the layer of scale 2 is reduced to 0. Also determined is a respective energy requirement E, needed to perform the descaling. Optimization in the lower-level layer of optimization 10 takes place with respect to the respective strip 2, that is, without considering other strips 2.

In a higher-level layer of optimization 11, an optimization is then performed for the respective sequence Gi, proceeding from the optimization in the lower-level layer of optimization 10 for the individual strips 2. In the course of the optimization in the higher-level layer of optimization 11, allowance is also made for transitions between the individual strips 2. As a result, in the higher-level layer of optimization 11 on the one hand, the staying times t determined for the individual strips in the lower layer of optimization 10 are varied, transitional times t' between individual strips 2 are determined and allowance is made for them and on the other hand, temperatures T of the pickling bath 1 are determined. The temperature T of the pickling bath 1 may be brought about for example by a heater 12 (see FIG. 1) or some other temperature influencing device.

Within the higher-level layer of optimization 11, a respective overall time ti (i=1, 2, 3, . . . ) and a respective overall energy requirement Ei (i=1, 2, 3, . . . ) are determined for the sequence Gi (i=1, 2, 3, . . . ) being considered. Depending on specified optimization criteria, it may for example be attempted in the higher-level layer of optimization 11 to minimize the overall time ti. Alternatively, it may be attempted to minimize the overall energy requirement Ei. Combinations are also possible.

The measure M is preferably determined so as to correspond to the optimization criteria. If, for example, exclusively the overall time ti is to be optimized, the overall time ti can be used directly as a measure M for the respective sequence Gi. The same applies analogously if exclusively the energy requirement Ei is to be minimized. A combination may for example be to normalize the respective overall time ti and the respective overall energy requirement Ei and to use a weighted or unweighted addition of the normalized variables as the respective measure M. The respective measure M may also be determined by a so-called cost function. The cost function may for example be based on material properties ME, production specifications, the state of the pickling line, the respective overall process time ti, the overall energy requirement Ei needed and boundary conditions R1, R2 to be observed (more on this later).

In a step S4 in FIG. 2, the computer 5 checks whether a termination criterion K is satisfied. If the termination criterion K is not satisfied, the computer 5 proceeds to a step S5. In step S5, the computer 5 varies the set sequences Gi according to an amendment specification V. After the varying of the set sequences Gi, the computer 5 returns to step S3. Various procedures are possible for varying the set sequences Gi. Purely by way of example, a number of possible procedures are presented below.

It is thus possible for example that the computer 5 varies the set sequences Gi in step S5 while making allowance for variables or interim results that have been determined in the course of the directly preceding implementation of step S3.

Furthermore, the computer 5 may vary the set sequences Gi in step S5 by using methods of mathematical optimization.

For example, in the course of genetic optimization methods the computer 5 may determine interfaces within the sequences Gi and re-assemble the parts of the sequences Gi that result from dividing the sequences Gi at the interfaces determined. Other procedures are also possible, for example when applying evolutionary optimization methods, particle swarm optimization methods or ant colony optimization methods. The corresponding methods are generally known to those skilled in the art. It is also alternatively possible to make allowance for boundary conditions or not to specify any boundary conditions. Examples of suitable mathematical optimization methods are

- methods of continuous optimization, such as for example simplex methods, interior point methods, trust region methods, cubic overregularization methods, SLP methods, SQP methods and methods of the Gaussian/Newtonian type; according to requirements, these methods may be of a linear or non-linear design;
- methods of discrete optimization, such as for example cutting plane methods, methods of the branch-and-bound type, network optimization methods, etc.;
- methods of mixed-integer optimization, for example as a combination of continuous and discrete methods;
- heuristic and metaheuristic methods of optimization, for example genetic methods, evolutionary methods, ant colony optimization methods, particle swarm optimization methods, simulated annealing and tabu search.

According to requirements, all of the methods can be performed without boundary conditions or be supplemented with boundary conditions to be observed. They may possibly also be combined with one another.

Furthermore, the mathematical optimization method may already be designed problem-specifically.

If on the other hand the termination criterion K is satisfied, the computer 5 goes over to a step S6. In step S6, the computer 5 selects one of the last-set sequences Gi. In a step S7, the computer 5 initiates the control of the pickling line according to the selected sequence Gi. For example, the computer 5 may determine the corresponding operating parameters and specify them to the controller 4.

Figure 4:
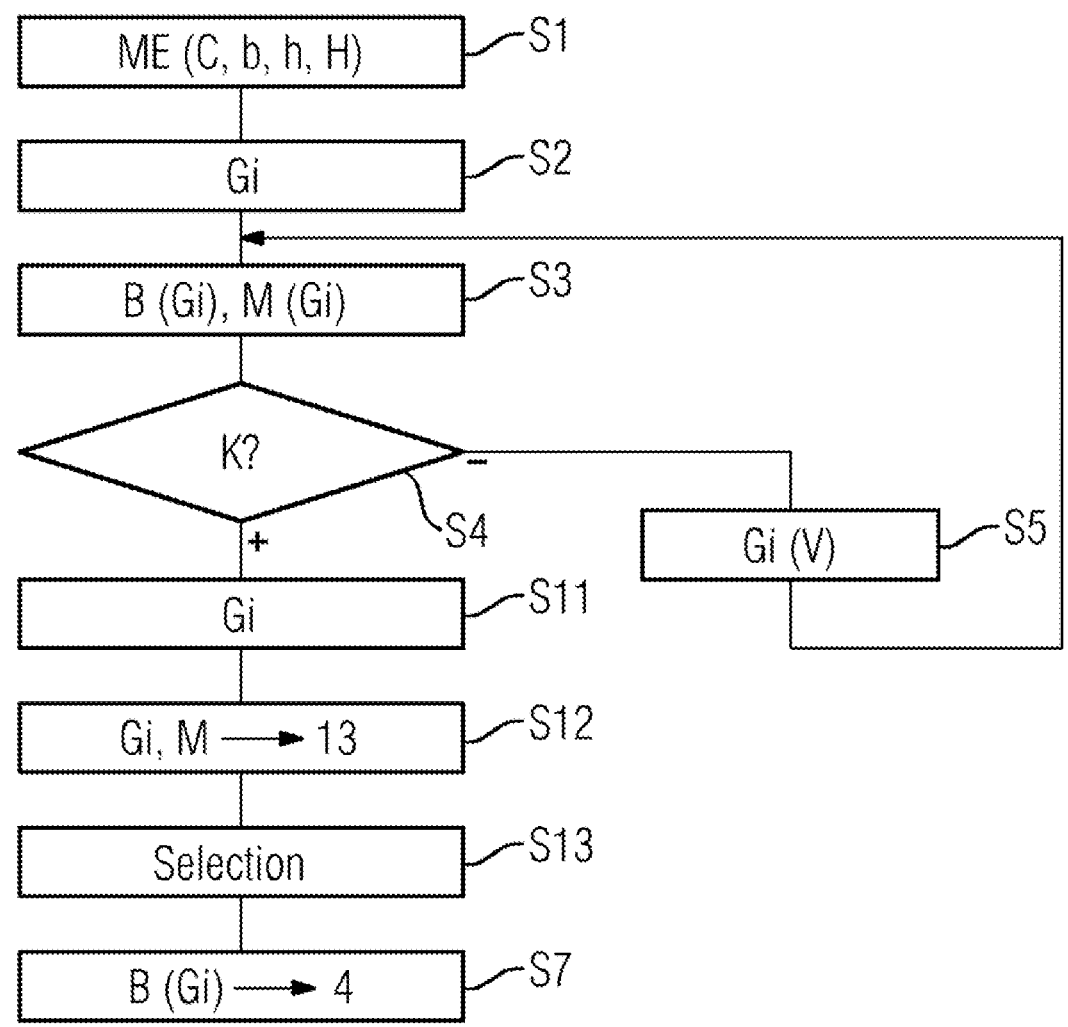
FIGS. 4 to 8 show flow diagrams in a schematic representation.

Alternatively, it is possible according to FIG. 4 that step S6 from FIG. 2 is replaced by steps S11 to S13. In this case, in a step S11 the computer 5 selects a number of the last-set sequences Gi. The selected sequences Gi comprise at least those of the last-set sequences Gi that the computer 5 deems to be preferred. It is also possible that the computer 5 selects all of the last-set sequences Gi. In step S12, the computer 5 offers the sequences Gi selected by it—the computer 5—in step S11 (see FIG. 1) together with their respective measure M—and possibly further information—to an operator 13 for selection. In step S13, the computer 5 receives a selection command SEL from the operator 13. The operator 13 uses the selection command 13 to select one of the sequences Gi offered to him. The procedure then continues with step S7, in which—as is also the case in FIG. 2—the computer 5 initiates the control of the pickling line according to the sequence Gi selected by the operator 13.

The procedure according to the invention may be designed in various aspects. One of the designs is explained more specifically below in connection with FIG. 5.

Figure 5:
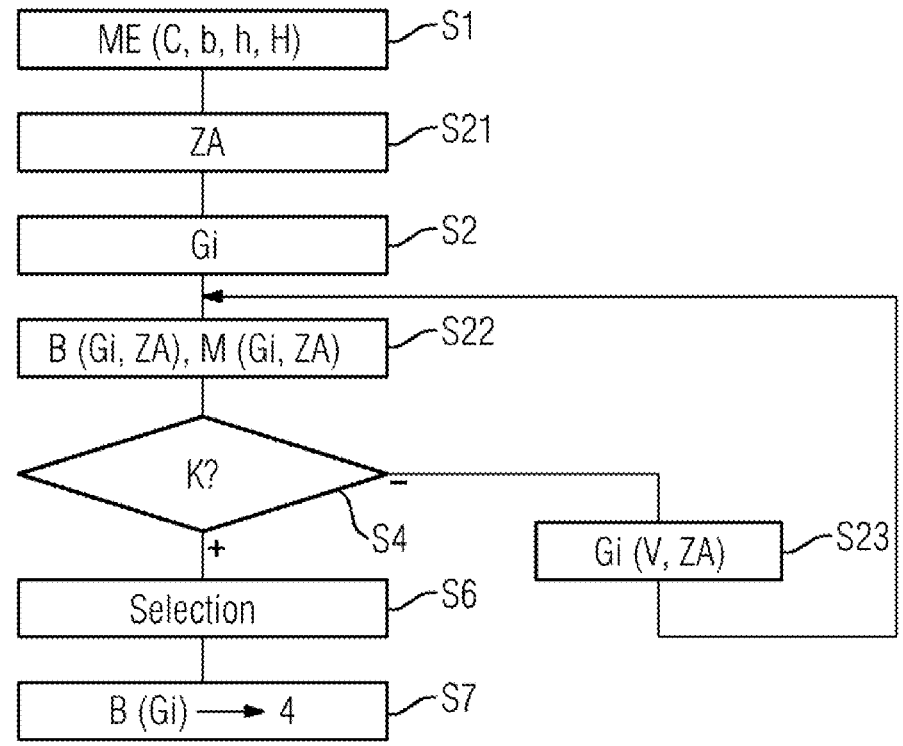

FIG. 5 is based on FIG. 2. It could however also be based on the modification according to FIG. 4. According to FIG. 5, step S1 is preceded or followed by a step S21. In step S21, the computer 5 receives an initial state ZA of the pickling line, in particular an initial state of the pickling bath 1, such as for example the temperature T and the chemical composition Z of the pickling bath 1. If step S21 is provided, step S3 may be replaced by a step S22. In step S22, the computer 5 realizes the same procedure as in step S3 from FIG. 2 or FIG. 4. In addition, however, the computer 5 makes allowance for the initial state ZA in the course of determining the respective optimized operating mode B of the pickling line. Alternatively or in addition, step S5 may be replaced by a step S23. In step S23, the computer 5 realizes the same procedure as in step S5 from FIG. 2 or FIG. 4. In addition, however, the computer 5 makes allowance for the initial state ZA in the course of the variation of the sequences Gi.

The initial state ZA may be known to the computer 5 in any desired way in principle. For example, corresponding data may be measured and transmitted to the computer 5 by means of the control device 4 or in some other way. Alternatively, the data may be determined by means of the model 9 of the pickling line or some other model (not represented in the figures). It is also possible that the corresponding data are specified to the computer 5 by the operator 13.

Figure 6:
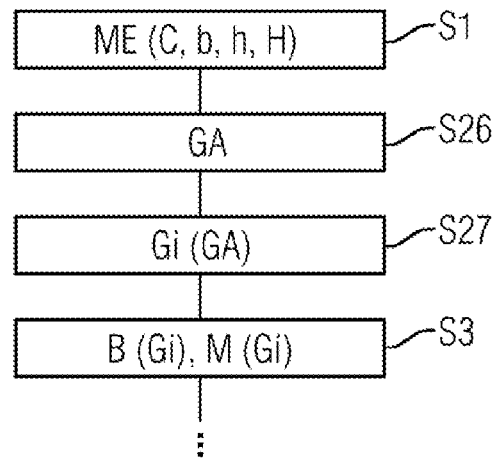

A further possible design is explained below in connection with FIG. 6. The design according to FIG. 6 is also based on the procedure from FIG. 2. However, it could also be based on the modification according to FIG. 4. Furthermore, the design according to FIG. 6 may be combined with the design from FIG. 5. However, it can similarly be realized without the design according to FIG. 5.

According to FIG. 6, step S1 is followed by a step S26. In step S26, the computer 5 determines an initial sequence GA of the strips 2. In this case, step S2 from FIG. 2 or FIG. 4 is replaced by a step S27. In step S27, the computer 5 determines the number of sequences Gi on the basis of the initial sequence GA.

Figure 7:
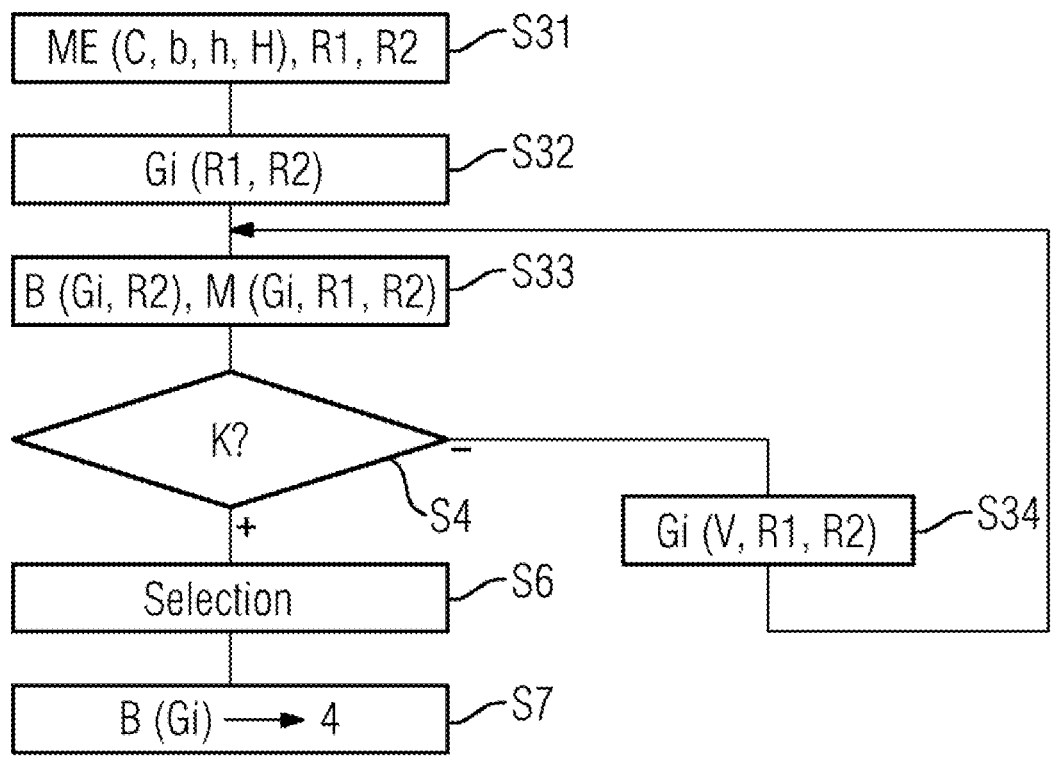

FIG. 7 also shows a further possible design of the procedure according to the invention. The design according to FIG. 7 is also based on the procedure from FIG. 2. However, it could also be based on the modification according to FIG. 4. Furthermore, the design according to FIG. 7 may be combined with the design from FIG. 5 and/or FIG. 6. However, it can similarly be realized without the design according to FIG. 5 and/or FIG. 6.

According to FIG. 7, step S1 is replaced by a step S31. In step S31—as also in step S1—the computer 5 receives information concerning the number of strips 2 to be pickled and also the material properties ME of the strips 2. In addition, the computer 5 receives boundary conditions R1 and/or R2. The boundary conditions R1 are with respect to the strips 2. For example, the boundary conditions R1 may comprise production specifications stipulating by which point in time certain ones of the strips 2 must be pickled. The boundary conditions R2 are with respect to the pickling line. For example, the boundary conditions R2 may comprise a maximum possible change in temperature and also a minimum possible and maximum possible temperature of the pickling bath 1.

If step S31 is provided, step S2 may be replaced by a step S32. In step S32, the computer 5 realizes the same procedure as in step S2 from FIG. 2 or FIG. 4. In addition, however, the computer 5 makes allowance for the boundary conditions R1 with respect to the strips 2 and/or the boundary conditions R2 with respect to the pickling line in the course of the determination of the sequences Gi. Alternatively or in addition, step S3 may be replaced by a step S33. In step S33, the computer 5 realizes the same procedure as in step S3 from FIG. 2 or FIG. 4. In addition, however, the computer 5 makes allowance for the boundary conditions R2 with respect to the pickling line in the course of the determination of the respective optimized operating mode of the pickling line. Possibly, the computer 5 may also additionally make allowance for the boundary conditions R1 with respect to the strips 2. Alternatively or in addition, step S5 may be replaced by a step S34. In step S34, the computer 5 realizes the same procedure as in step S5 from FIG. 2 or FIG. 4. In addition, however, the computer 5 makes allowance in the course of the variation of the sequences Gi at least for the boundary conditions R1 with respect to the strips 2. Possibly, the computer 5 may additionally also make allowance for the boundary conditions R2 with respect to the pickling line.

It is—of course—possible first to perform the operating method according to the invention (according to FIGS. 2 to 7) and only after that initiate the control of the pickling line so as to correspond to the selected sequence Gi. However, it is similarly possible to perform the operating method according to the invention while a strip 2 is already in the pickling line. For example, the corresponding strip 2 may already be in a feed line upstream of the pickling bath 1 or, in the case of a number of pickling baths 1, upstream of the first pickling bath 1. If in this case this strip 2 is to be contained in the sequences Gi, the strip 2 that is in the pickling line must however be the first strip 2 in the sequences Gi that are set in step S2. Furthermore, in this case the strip 2 that is in the pickling line must remain the first strip 2 in the sequences Gi that are varied in step S5.

The same procedure may also be adopted if a number of strips 1 are already in the pickling line. In this case, the aforementioned statements apply to all of the strips 2 that are already in the pickling line. Furthermore, in this case the sequence of the strips 2 that are already in the pickling line must be retained.

It is also possible to design the procedure according to FIG. 2 (or FIG. 4) as explained more specifically below in connection with FIG. 8. According to requirements, the design according to FIG. 8 may also be combined with one or more of the designs according to FIGS. 5, 6 and 7.

Figure 8:
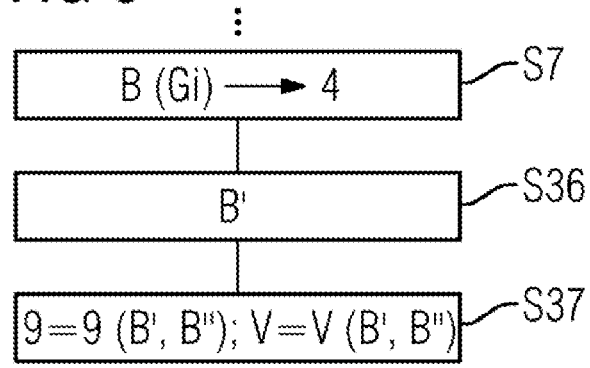

According to FIG. 8, following on from the implementation of step S7, in a step S36 the computer 5 receives actual operating data B' of the pickling line from the control device 4. These data were recorded in advance by the control device 4, while the control device 4 was controlling the pickling line according to the sequence Gi selected in step S7. In a step S37, the computer 5 compares the actual operating data B' with expected operating data B", which has been determined on the basis of the model 9 of the pickling line. Furthermore, in step S37 the computer 5 adapts the model 9 of the pickling line and/or the amendment specification V on the basis of a deviation of the operating data B' of the pickling line from the expected operating data B" of the pickling line.

To sum up, the present invention consequently relates to the following matter:

A number of strips 2 that have initial material properties ME are to be pickled in a pickling line. For this purpose, a computer 5 sets a number of sequences Gi, which respectively contain the number of strips 2 to be pickled. The computer 5 determines for the set sequences Gi a respective optimized operating mode of the pickling line by means of a model 9 of the pickling line based on mathematical-physical equations and by using their initial material properties ME and determines at least one respective measure M on the basis of the operating mode. As long as a termination criterion K is not satisfied, the computer 5 varies the set sequences Gi and re-determines respective optimized operating modes of the pickling line and associated measures M. As soon as the termination criterion K is satisfied, the computer 5 either selects one of the last-set sequences Gi and initiates the control of the pickling line according to the selected sequence Gi or offers a number of the last-set sequences Gi together with their respective measure M to an operator 13 for selection, receives from the operator 13 a selection command SEL for selecting one of the sequences Gi offered and initiates the control of the pickling line according to the sequence Gi selected by the operator 13.

The present invention has many advantages. In particular, a better optimization of the production plan than in the prior art is possible in an easy and reliable way. Furthermore, no operator know-how, that is to say know-how of the operator of the pickling line, is needed for the optimization.

Although the invention has been illustrated more specifically and described in detail by the preferred exemplary embodiment, the invention is not restricted by the examples disclosed and other variations may be derived therefrom by a person skilled in the art without departing from the scope of protection of the invention.

The invention claimed is:

1. An operating method for determining an optimized production plan for a plurality of strips to be pickled on a pickling line, each strip of the plurality of strips to be pickled having initial material properties, the operating method comprising:

a) receiving information regarding the plurality of strips, including for respective strips of the plurality of strips initial material properties comprising at least one of a chemical composition, a geometrical parameter, and a pre-history, and setting, by a computer, a set of sequences, wherein each sequence contains a number of the strips of the plurality of strips to be pickled and the set of sequences contains all the strips of the plurality of strips to be pickled and represents a permutation of the plurality of strips to be pickled;

b) determining, by the computer, for each sequence of the set of sequences, a respective optimized operating mode of the pickling line, wherein the optimized operating mode achieves at least one of an optimized overall time for the pickling of the sequence of strips and an optimized overall energy requirement for the pickling of the sequence of strips, the optimized operating mode determined so as to free each strip of the sequence of strips from a layer of scale by the pickling of the pickling line, wherein the determining of the respective optimized operating mode is conducted by determining for each strip of the sequence of strips a resultant thickness of the layer of the scale based on a staying time of the strip in the pickling bath, a temperature of the pickling bath, a composition of the pickling bath, and the initial material properties of the strips, and determining a value for at least one measure of optimized production for the respective optimized operating mode, wherein the at least one measure of optimized production comprises the at least one of the overall time for the pickling of the sequence of strips and the overall energy requirement of the pickling line for pickling the sequence of strips;

determining if a termination criterion is satisfied, wherein the termination criterion comprises at least one of the following:

that no improvements or only marginal improvements of the at least one measure of optimized production have occurred during a number of successive iterations of operations b) and c), and that a specified maximum number of iterations operations b) and c) has been reached; and c) as long as the termination criterion is not satisfied, varying, by the computer, the set of sequences and returning to step b);

d) as soon as the termination criterion is satisfied, performing, by the computer one of:

(1) selecting a last-varied set of sequences and initiating control of the pickling line according to the selected set of sequences, or (2) offering at least two of the last-varied sets of sequences together with the respective values of the at least one measure to an operator for selection, receiving from the operator a selection command for selecting one set of the set of sequences offered, and initiating the control of the pickling line according to the set of sequences selected by the operator.

2. The operating method as claimed in claim 1, further comprising:

receiving, by the computer, boundary conditions with respect to the strips and/or with respect to the pickling line, wherein the determining of the respective optimized operating mode is conducted based on the received boundary conditions, wherein the boundary conditions comprise at least one of: (1) by which point in time a first strip of the set of strips must be pickled, (2) a maximum change in temperature of the pickling bath, (3) a minimum temperature of the pickling bath, and (4) a maximum temperature of the pickling bath.

3. The operating method as claimed in claim 1, further comprising:

receiving, by the computer, an initial state of the pickling line; and making allowance for the initial state of the pickling line in the course of the determining of the respective optimized operating mode of the pickling line and/or the variation of the sequences.

4. The operating method as claimed in claim 1, further comprising:

determining, by the computer, an initial sequence of the strips before the implementation of step a); and determining, by the computer, the set of sequences in step a) on the basis of the initial sequence.

5. The operating method as claimed in claim 1, further comprising:

varying, by the computer, the set of sequences in step c) by making allowance for variables or interim results determined in the course of step b).

6. The operating method as claimed in claim 1, wherein the varying, by the computer, of the set of sequences uses methods of mathematical optimization.

7. The operating method as claimed in claim 1, wherein the steps a) to d) are implemented while a strip is already in the pickling line, the strip in the pickling line is the first strip in the sequences set in step a), and the strip in the pickling line remains the first strip in the sequences varied in step c).

8. The operating method as claimed in claim 1, further comprising:

recording operating data of the pickling line during the control of the pickling line according to the selected sequence and model of the pickling line; and/or wherein the varying the set of sequences is performed on the basis of a deviation of the operating data of the pickling line from expected operating data of the pickling line.

9. A computer program product comprising a non-volatile, machine readable, computer program storage medium comprising a computer program comprised of program code stored on the storage medium;

the program code comprising control commands that when the program code is executed by a computer, the implementation of the commands has the effect to cause the computer to perform an operating method as claimed in claim 1 on a pickling line.

10. The computer comprising the computer program product as claimed in claim 9.

11. The computer as claimed in claim 10, wherein the computer is formed as a control device for a pickling line for pickling strips or is connected to such a control device.

* * * * *